US005283093A

United States Patent [19]

All

[11] Patent Number: 5,283,093

[45] Date of Patent: Feb. 1, 1994

[54] SELF-LAMINATING IDENTIFICATION BADGE ASSEMBLY AND METHOD OF USE

[75] Inventor: William C. All, Marietta, Ga.

[73] Assignee: Panduit Corp., Tinley Park, Ill.

[21] Appl. No.: 823,493

[22] Filed: Jan. 21, 1992

[51] Int. Cl.[5] ........................... B32B 3/04; B32B 3/06

[52] U.S. Cl. ........................................ 428/41; 428/40; 428/202; 428/203; 283/75; 283/109; 40/1.5; 40/630; 462/2; 462/3

[58] Field of Search ..................... 428/40, 41, 42, 202, 428/203; 283/75, 109; 462/2, 3; 40/1.5, 299, 630

[56] References Cited

U.S. PATENT DOCUMENTS

| | | | |
|---|---|---|---|
| 3,486,257 | 12/1969 | Walldorf | 40/299 |
| 4,248,919 | 7/1981 | Davis | 428/40 |
| 4,579,759 | 4/1986 | Breuers | 428/375 |
| 4,814,216 | 3/1989 | Brunett et al. | 428/43 |
| 4,884,827 | 12/1989 | Kelley | 283/81 |
| 4,925,716 | 5/1990 | Haas | 428/41 |
| 4,986,868 | 1/1991 | Schmidt | 156/249 |
| 5,083,979 | 1/1992 | Burt | 462/3 |

*Primary Examiner*—Alexander S. Thomas

*Attorney, Agent, or Firm*—Charles R. Wentzel; Mark D. Hilliard; Robert A. McCann

[57] ABSTRACT

A continuous form assembly of self-laminating badges, includes a continuous length of transparent lamina, a lamina of pressure sensitive adhesive adhered to a first surface of the transparent lamina, and a continuous length of carrier paper releasably adhered to the lamina of pressure sensitive adhesive which mounts the transparent lamina. A plurality of spaced apart transverse cuts through the thickness and across the width of the transparent lamina forms a plurality of badges each of which includes, a print field for recording written or printed information disposed on a portion of a second surface of the transparent lamina, wherein a remaining portion of the transparent lamina not covered by the print field includes a lamination portion of sufficient proportion to be folded to cover both forward and rearward surfaces of an area of the transparent lamina covered by the print field. The pressure sensitive adhesive lamina is disposed on at least a portion of the first surface of the transparent lamina in a position to adhere the print field to the lamentation portion such that when the badge is assembled the lamination portion covers and adheres to both.

15 Claims, 9 Drawing Sheets

SELF-LAMINATING IDENTIFICATION BADGE ASSEMBLY AND METHOD OF USE

TECHNICAL FIELD

The present invention generally relates to identification badges laminated with a transparent protective layer.

BACKGROUND ART

The use of a transparent lamina of plastic to cover and protect the information on a separately manufactured identification badge is well known. Typically the transparent lamina includes a layer of pressure sensitive adhesive adhered to one side of the lamina which is supported by a sheet of release paper. The badge is manufactured separately from the transparent lamina and typically is marked with information one at a time by hand, by a typewriter or by a printer. The lamina must then be removed from the release paper, carefully aligned with the badge and applied to the badge.

An identification tag that folds and laminates a transparent lamina over an adjacent single sided message surface is suggested in U.S. Pat. No. 3,486,257.

Current identification badges or certification badges (that evidence the certification of a list of skills of the wearer) often require entry of information on both sides of the badge. The presence of information on both sides of an identification badge makes it desirable to apply a protective cover to both sides of the badge, thus known badges require the careful manipulation of two transparent lamina into alignment and contact with both sides of the badge.

The use of temporary passes or daily issued certification badges by large organizations requires the rapid issuance of a large number of badges, necessitating that the badge issuance and lamination process be as rapid as possible.

Thus, there exists a need in the art for a badge which can be economically manufactured, easily and quickly marked on both sides with the desired information and laminated with a transparent protective lamina to cover and protect both sides of the badge.

Disclosure of The Invention

It is an object of the present invention to provide a badge assembly that can be economically manufactured, marked with desired information and laminated with a transparent or partially transparent protective lamina to protect the marked information.

It is an additional object of the present invention to provide a badge assembly that can laminate and protect both sides of a badge.

These and other objects, together with the advantages thereof over existing prior art forms, which will become apparent form the following specification, are accomplished by means hereinafter described.

In general, a self-laminating badge includes a transparent lamina, a print field for recording written or printed information disposed on a portion of a first surface of the transparent lamina, wherein a remaining portion of the transparent lamina not covered by the print field comprises a lamination portion of sufficient proportion to be folded to cover both forward and rearward surfaces of an area of the transparent lamina covered by the print field; and a pressure sensitive adhesive lamina disposed on at least a portion of a second surface of the transparent lamina in a position to adhere the print field to the lamentation portion such that when the badge is assembled, the lamination portion covers and adheres to both forward and rearward surfaces of the area of the transparent lamina covered by the print field.

DESCRIPTION OF THE PREFERRED EMBODIMENTS

Figure 1:
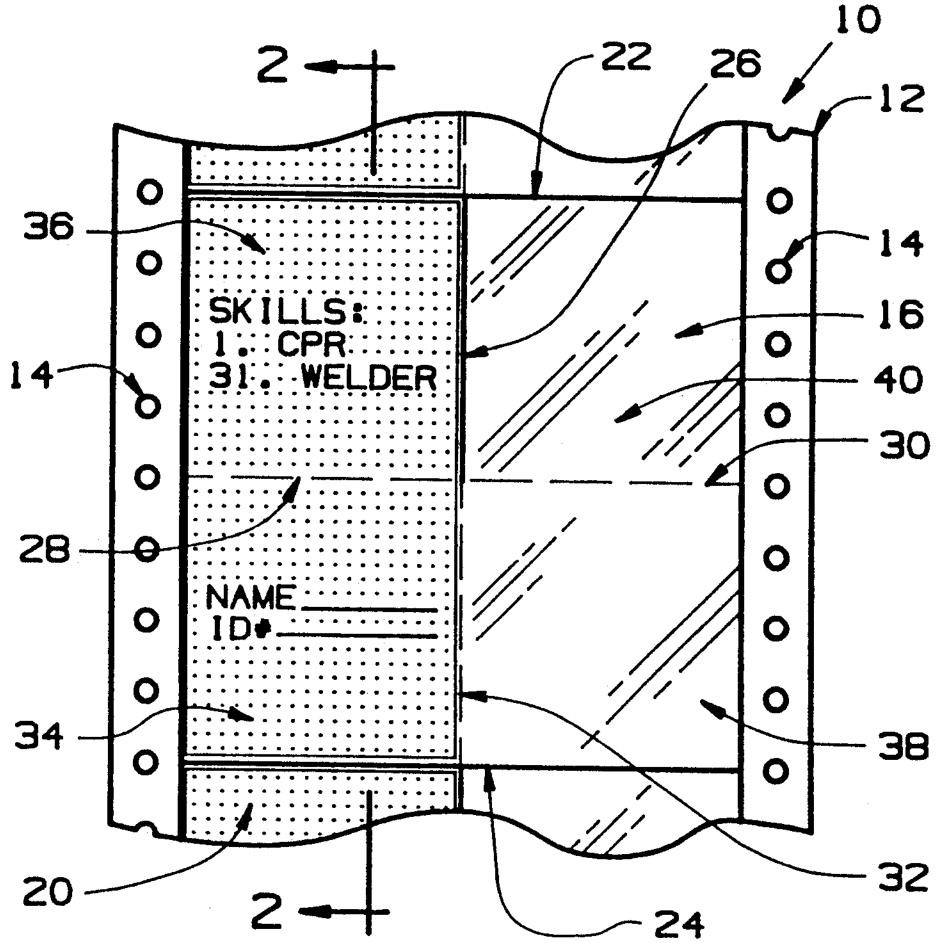
FIG. 1 is a top view of a first embodiment of the self-laminating identification badge assembly of the present invention.
Figure 2:
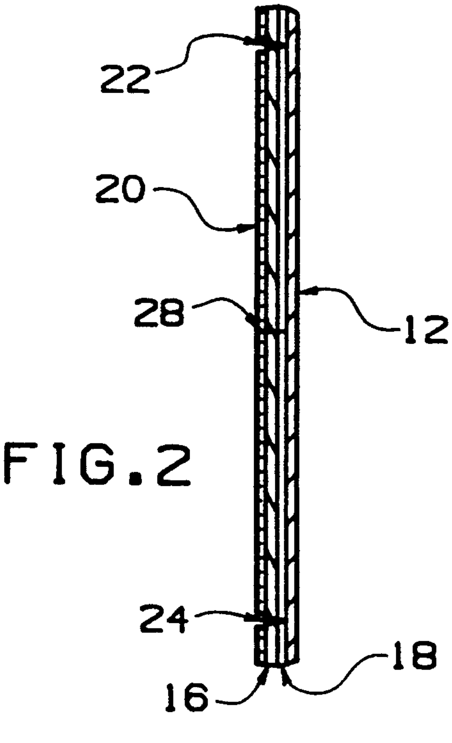
FIG. 2 is a sectional view of the badge assembly of FIG. 1 taken along line 2—2 of FIG. 1.

The following specification and the drawings set forth the preferred embodiments of the present invention and disclose the best modes of the claimed invention that I presently contemplate.

A first preferred embodiment of a self-laminating identification badge assembly illustrating the concept of the present invention is designated in the drawings by the numeral 10. Badge assembly 10 includes a continuous length of carrier paper 12 having a row of pin feed holes 14 adjacent opposite edges of paper 12 extending the length of paper 12 for engagement with the drive mechanism of a computer controlled printer (not shown). Carrier paper 12 preferably is manufactured in a long continuous length with at least one smooth or release surface. A corresponding continuous length of a transparent lamina 16 is temporarily adhered to the release surface of paper 12 by a pressure sensitive adhesive lamina 18. Transparent lamina 16 is preferably formed of a clear polyester plastic although clear vinyl or other clear plastics may also be used. A paint lamina 20 is applied to the outer surface of transparent lamina 16 by a corona process that imparts an electrostatic charge to the polyester lamina 16 that attracts paint lamina 20. Paint lamina 20 forms a surface that accepts handwritten or printed information. Paint lamina 20 preferably is white and is illustrated in the drawings as a field of dots. Legends which are standard to all badges can be painted or pre-printed in black on the white paint lamina. This standard information is illustrated in FIGS. 1–18 as NAME, ID#, and SKILLS:, 1. CPR, 31. WELDER. Although painting is preferred, paper, plastic or other material laminas could be affixed to transparent lamina 16 to form a surface that accepts writing. Also, the surface of transparent lamina 16 could be abraded or chemically modified to provide a print accepting surface.

A plurality of cuts are made in transparent lamina 16 to complete self-laminating badge assembly 10. These cuts are made through the thickness of transparent lamina 16 in continuous lines or cuts or intermittently in lines of perforation. The continuous cut lines divide adjacent areas of transparent lamina 16 while the lines of perforation form lines that facilitate folding of adjacent areas of lamina 16. Fold lines could also be formed by deforming a line in transparent lamina 16, by example, scoring a non-penetrating line. Cuts or perforation lines are designated transverse when they are oriented transverse to the length of badge assembly 10 and are designated parallel when they are parallel to the same.

Transparent lamina 16 is cut into separate badge sections by parallel, spaced apart, first and second transverse cuts 22 and 24. Cuts 22 and 24 are continuous cuts that are formed perpendicular to the length of badge assembly 10.

A continuous first parallel cut 26 is formed in and through the center of transparent lamina 16, adjacent to but spaced from the edge of paint lamina 20. First parallel cut 26 extends from first transverse cut 22 half the length of an individual badge section.

First and second transverse perforated fold lines 28 and 30 extend across and through transparent lamina 16, intersecting and oriented perpendicular to first parallel cut 26. A first parallel perforated fold line 32 extends from and parallel to first parallel cut 26 until it intersects second transverse cut 24.

The above described cuts and perforated fold lines divide transparent lamina 16 into a forward print field 34, a rearward print field 36, a rearward transparent lamination section 38 and a forward transparent lamination section 40.

Forward print field 34 and rearward print field 36 are separated by medially disposed first transverse perforated fold line 28 while forward and rearward transparent lamination sections 38 and 40 are separated by medially disposed second transverse perforated fold line 30. Print fields 34 and 36 are joined to transparent lamination sections 38 and 40 only along first parallel perforated fold line 32.

After the desired information is written or printed on print fields 34 or 36, transparent lamina 16 is removed from the release surface of paper 12 and a laminated badge 42 (see FIG. 6) is assembled in the sequence shown in FIGS. 3–6.

Figure 3:
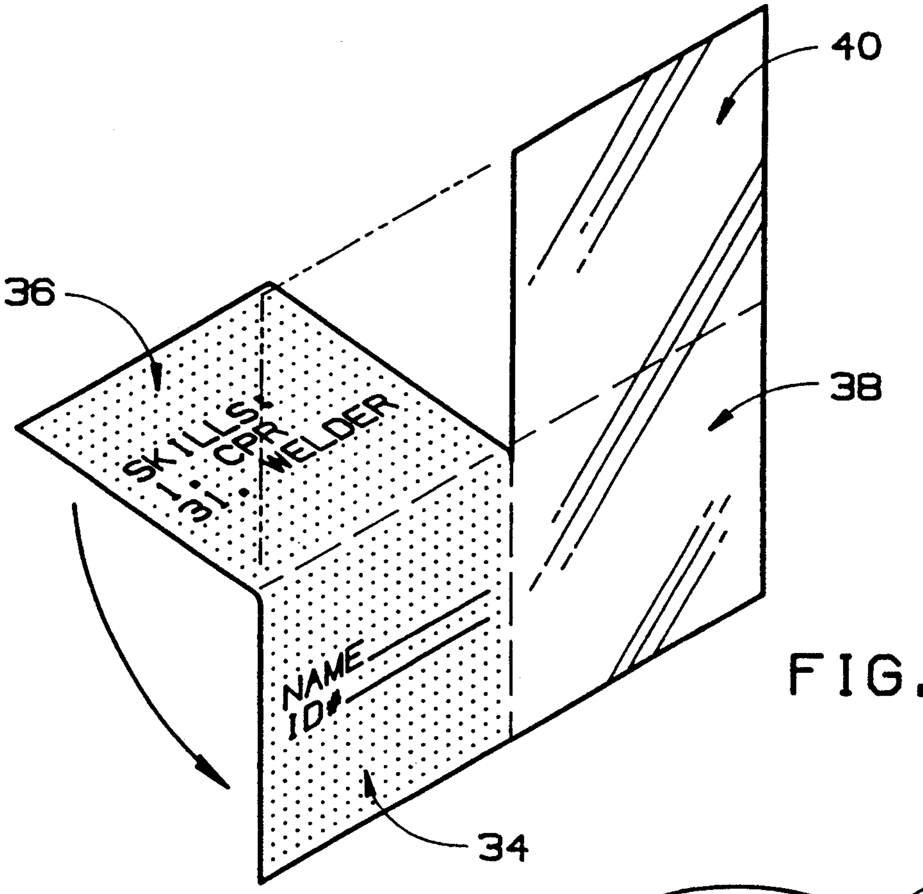
FIG. 3 is a perspective view of a badge removed from the carrier paper of the badge assembly of FIG. 1 depicting a rearward print field as it is folded in the direction of the arrow into congruent juxtaposition with a forward print field.

FIG. 3 illustrates a first fold along first transverse perforated fold line 28 (see FIG. 1) in the direction of the arrow of rearward print field 36 into congruent juxtaposition with a forward print field 34. Pressure sensitive adhesive lamina 18 disposed on the surface opposite print fields 34 and 36 adheres field 34 to 36 as seen in FIG. 4.

Figure 4:
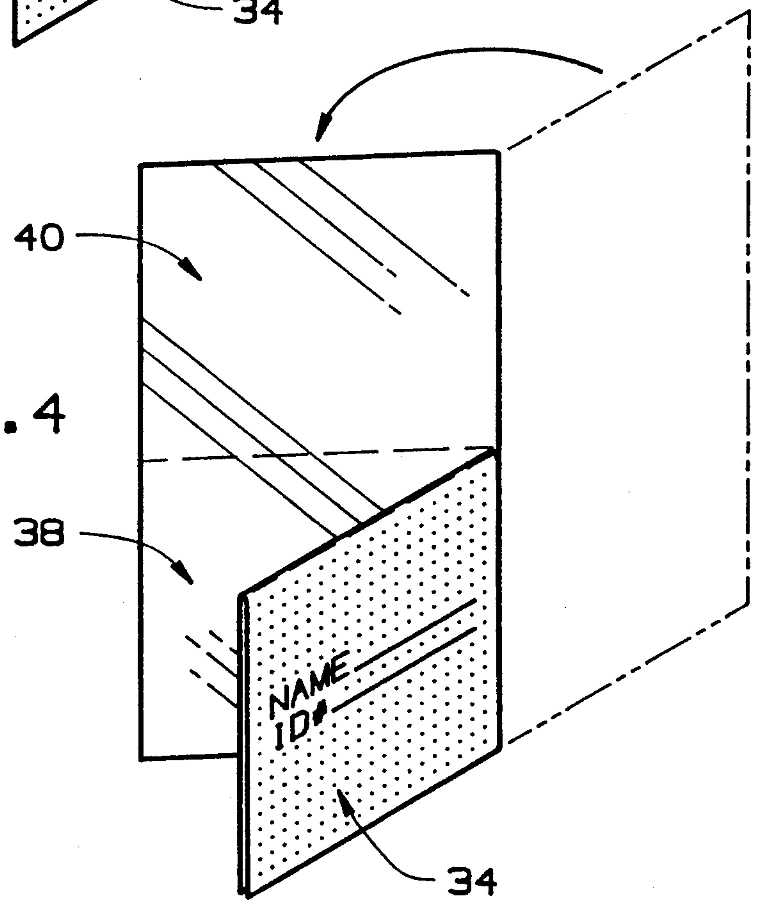
FIG. 4 is perspective view of the badge of FIG. 3 depicting a rearward transparent lamination section as it is folded in the direction of the arrow into superimposition with the rearward print field.

FIG. 4 illustrates the next fold in the direction of the arrow along first parallel perforation line 32 (see FIG. 1) of rearward transparent lamination section 38 into superimposition with the rearward print field 36.

Figure 5:
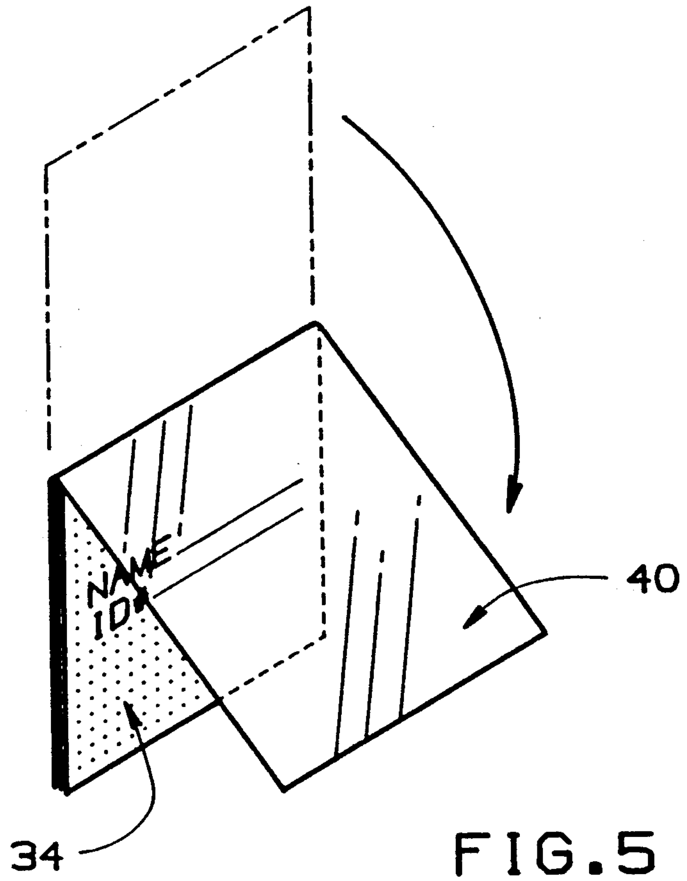
FIG. 5 is a perspective view of the badge of FIG. 4 depicting a forward transparent lamination section as it is folded in the direction of the arrow into superimposition with the forward print field.
Figure 6:
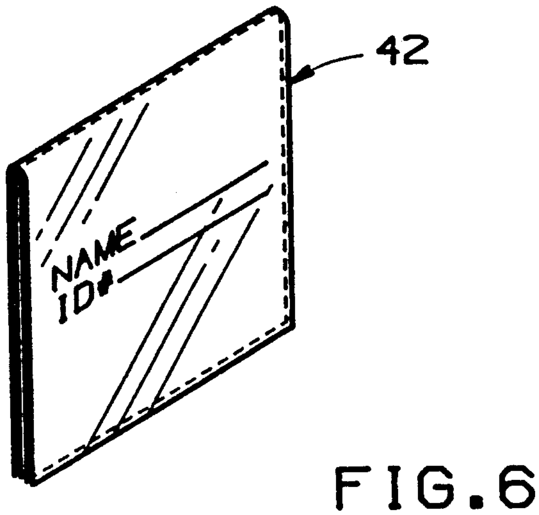
FIG. 6 is a perspective view of the assembled laminated badge of FIG. 5.
Figure 7:
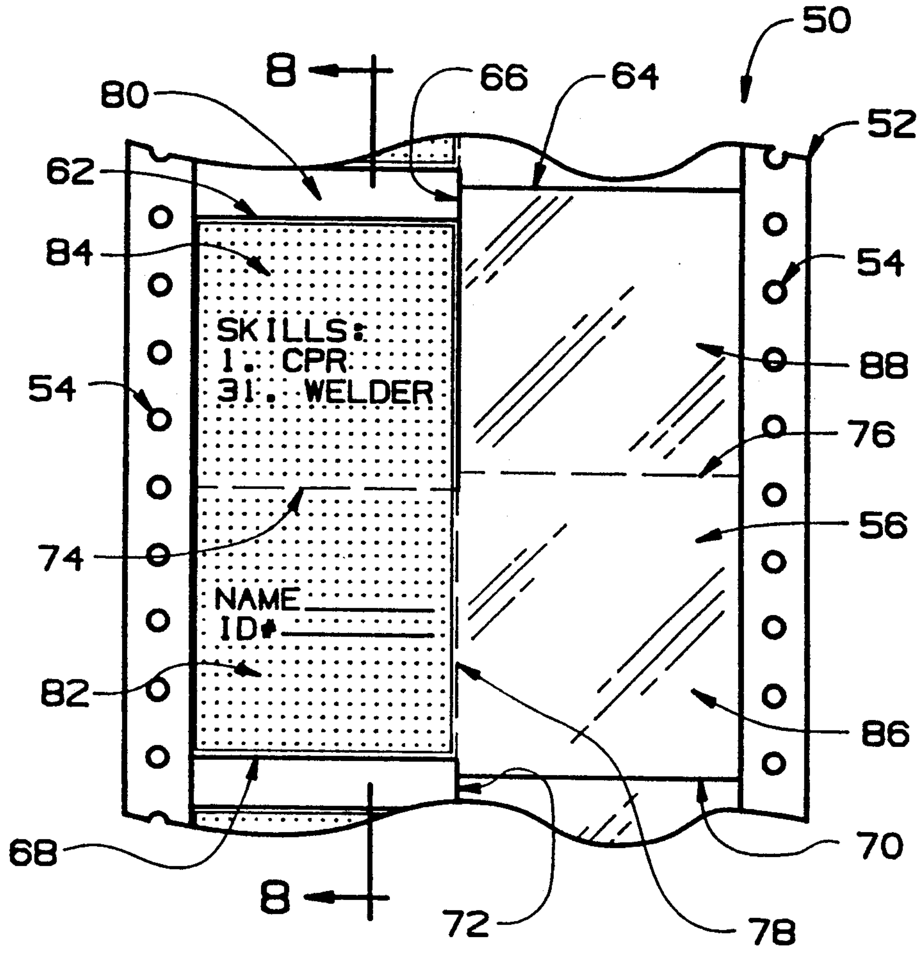
FIG. 7 is a top view of a second embodiment of the self-laminating identification badge assembly of the present invention.
Figure 8:
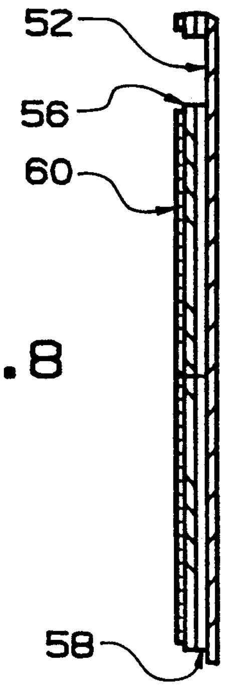
FIG. 8 is a sectional view of the badge assembly of FIG. 7 taken along line 8—8 of FIG. 7.

FIG. 5 illustrates the final fold in the direction of the arrow along second transverse perforated fold line 30 (see FIG. 1) of forward transparent lamination section 40 into superimposition with the forward print field 34. Pressure sensitive adhesive lamina 18 adheres lamination sections 38 and 40 to print fields 36 and 34 to produce a laminated badge 42 of FIG. 6.

It should be noted that although I have herein described the preferred construction of a badge assembly, that a rearrangement of the relative positions of print fields 34 and 36 and the lamination sections 38 and 40 is also contemplated by and within the teaching of my invention. For example, rearward lamination section 40 could be placed outwardly of and in line with lamination section 38 and/or print field 36 could be placed outwardly of and in line with print field 34.

A second preferred embodiment of a self-laminating identification badge assembly is depicted in FIGS. 7–12 and is designated generally by the numeral 50. Badge assembly 50 is designed such that, when assembled, the three free peripheral edges of its transparent lamination sections overlap, resulting in a badge having sealed edges.

Badge assembly 50 is constructed of the same materials and in the same manner as described for badge assembly 10. Badge assembly 50 includes a continuous length of carrier paper 52 having a row of pin feed holes 54 extending the length of paper 52 for engagement with the drive mechanism of a computer controlled printer (not shown). A corresponding continuous length of a transparent lamina 56 is temporarily adhered to the release surface of paper 52 by a pressure sensitive adhesive lamina 58. A paint lamina 60 is applied to the outer surface of transparent lamina 56 to form a surface that accepts handwritten or printed information. Paint lamina 60 preferably is white and is illustrated in the drawings as a field of dots.

A plurality of cuts are made in transparent lamina 56 to complete self-laminating badge assembly 50. These cuts are made through the thickness of transparent lamina 56 in continuous lines or cuts or intermittently in lines of perforation. The continuous cut lines divide adjacent areas of transparent lamina 56 while the lines of perforation form lines that facilitate folding of adjacent areas of lamina 56. Cuts or perforation lines are designated transverse when they are oriented transverse to the length of badge assembly 50 and are designated parallel when they are parallel to the same.

Transparent lamina 56 is cut into separate badge sections by the combination of first and second transverse cuts 62 and 64 interconnected by first parallel cut 66 and the spaced apart combination of third transverse cut 68 and fourth transverse cut 70 interconnected by second parallel cut 72. First parallel cut 66 is formed in and through the center of transparent lamina 56, adjacent to but spaced from the edge of paint lamina 60. First parallel cut 66 extends from first and second transverse cuts 62 and 64 approximately half the length of an individual badge section.

First and second transverse perforated fold lines 74 and 76 extend across and through transparent lamina 56, intersecting and oriented perpendicular to first parallel cut 66. A first parallel perforated fold line 78 extends from and parallel to first parallel cut 66 until it intersects third and fourth transverse cuts 68 and 70.

A portion of transparent lamina 56 is die cut and removed forming die cut area 80 for each badge.

The above described cuts and perforated fold lines divide transparent lamina 56 into a forward print field 82, a rearward print field 84, a rearward transparent lamination section 86 and a forward transparent lamination section 88.

Forward print field 82 and rearward print field 84 are separated by medially disposed first transverse perforated fold line 74 while forward and rearward transparent lamination sections 86 and 88 are separated by medially disposed second transverse perforated fold line 76. Print fields 82 and 84 are joined to transparent lamination sections 86 and 88 only along first parallel perforated fold line 78.

After the desired information is written or printed on print fields 82 or 84, transparent lamina 56 is removed from the release surface of paper 52 and a laminated badge 90 (see FIG. 12) is assembled in the sequence shown in FIGS. 9–12.

Figure 9:
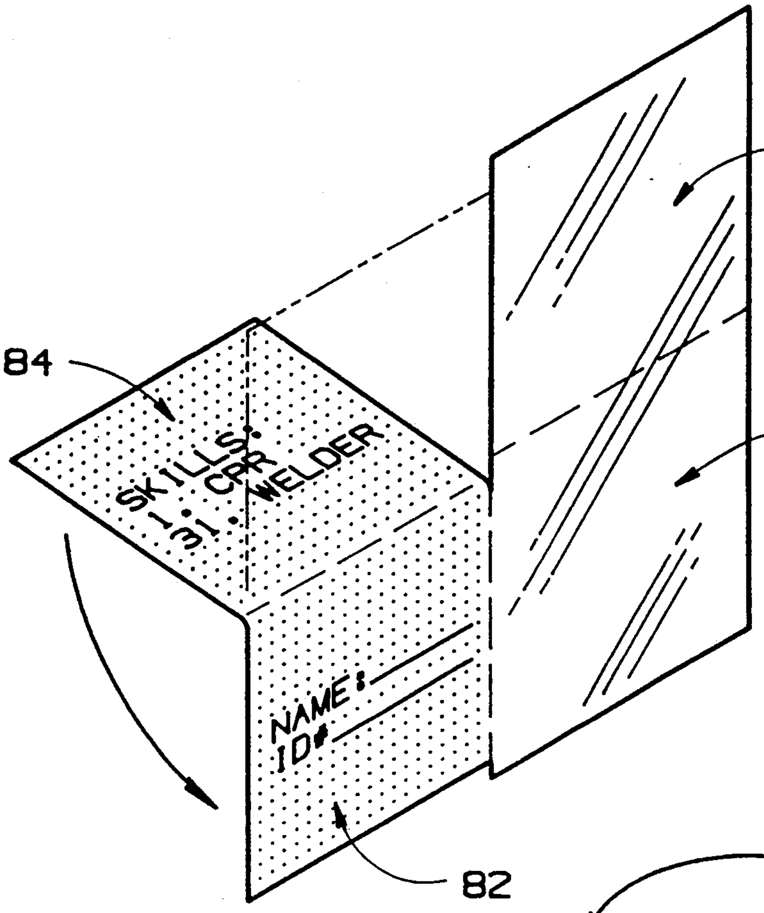
FIG. 9 is a perspective view of a badge removed from the carrier paper of the badge assembly of FIG. 7 depicting a rearward print field as it is folded in the direction of the arrow into congruent juxtaposition with a forward print field.

FIG. 9 illustrates a first fold along line 74 (see FIG. 7) in the direction of the arrow of rearward print field 84 into congruent juxtaposition with a forward print field 82. Pressure sensitive adhesive lamina 58 disposed on the rear surface of print fields 82 and 84 adheres field 82 to 84 as seen in FIG. 10.

Figure 10:
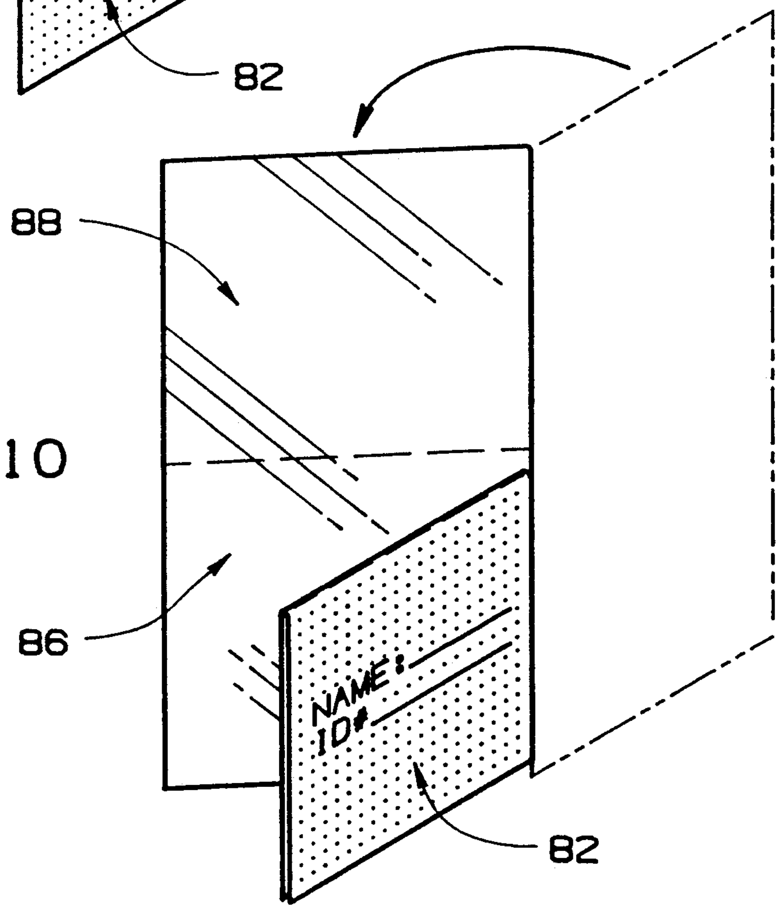
FIG. 10 is perspective view of the badge of FIG. 9 depicting a rearward transparent lamination section as it is folded in the direction of the arrow into superimposition with the rearward print field.

FIG. 10 illustrates the next fold in the direction of the arrow along first parallel perforation line 78 (see FIG. 7) of rearward transparent lamination section 86 into superimposition with the rearward print field 84.

Figure 11:
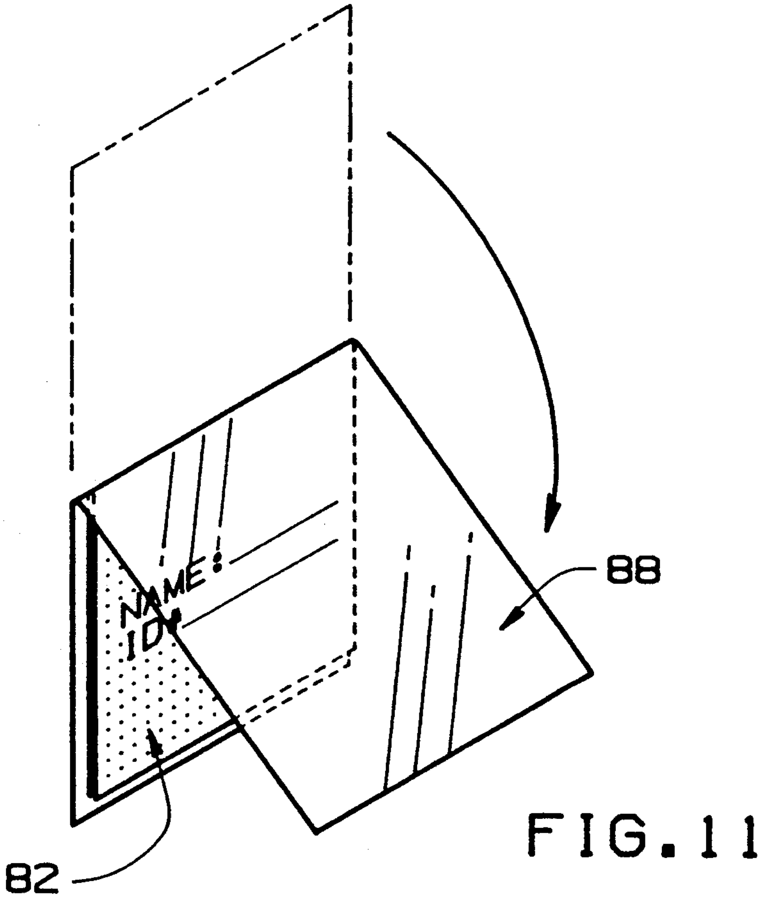
FIG. 11 is a perspective view of the badge of FIG. 10 depicting a forward transparent lamination section as it is folded in the direction of the arrow into superimposition with the forward print field.
Figure 12:
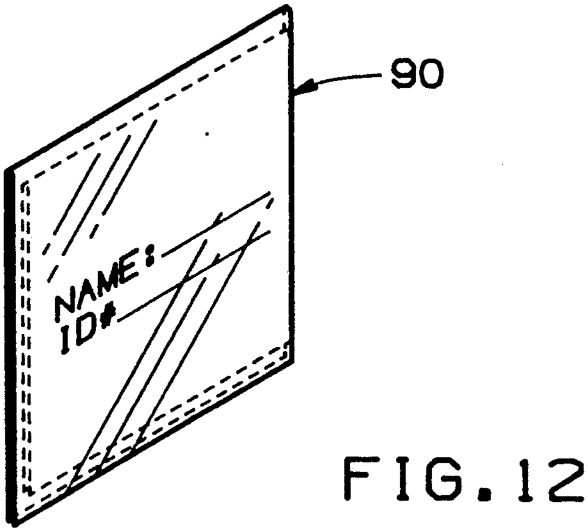
FIG. 12 is a perspective view of the assembled laminated badge of FIG. 11.
Figure 13:
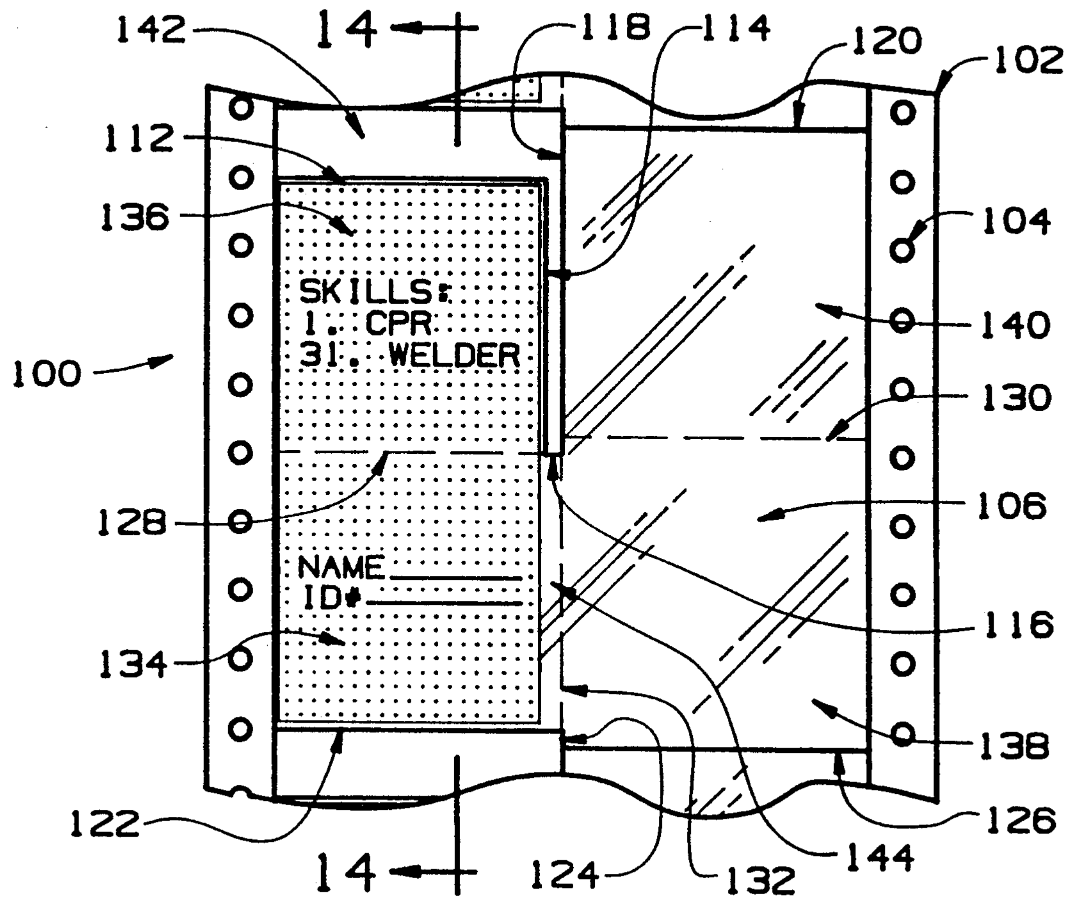
FIG. 13 is a top view of a third embodiment of the self-laminating identification badge assembly of the present invention.
Figure 14:
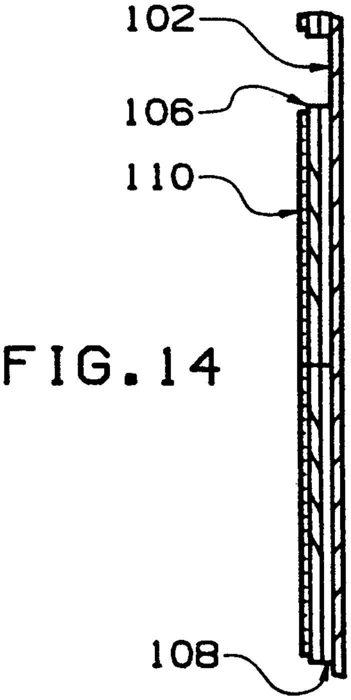
FIG. 14 is a sectional view of the badge assembly of FIG. 13 taken along line 14—14 of FIG. 13.

FIG. 11 illustrates the final fold in the direction of the arrow along second transverse perforated fold line 76 (see FIG. 7) of forward transparent lamination section 88 into superimposition with the forward print field 82. Pressure sensitive adhesive lamina 58 adheres lamination sections 86 and 88 to print fields 82 and 84 to produce a laminated badge 90 of FIG. 12. As seen in FIG. 12, the free peripheral edges of lamination sections 86 and 88 overlap print fields 82 and 84 to adhere to the opposite margins and seal print fields 82 and 84.

A third preferred embodiment of a self-laminating identification badge assembly is depicted in FIGS. 13-18 and is designated generally by the numeral 100. Badge assembly 100 is designed such that, when assembled, the all four peripheral edges of its transparent lamination sections overlap, resulting in a badge having four sealed edges.

Badge assembly 100 is constructed of the same materials and in the same manner as described above for badge assembly 10. Badge assembly 100 includes a continuous length of carrier paper 102 having a row of pin feed holes 104 extending the length of paper 102 for engagement with the drive mechanism of a computer controlled printer (not shown). A corresponding continuous length of a transparent lamina 106 is temporarily adhered to the release surface of paper 102 by a pressure sensitive adhesive lamina 108. A paint lamina 110 is applied to the outer surface of transparent lamina 106 to form a surface that accepts handwritten or printed information. Paint lamina 110 preferably is white and is illustrated in the drawings as a field of dots.

A plurality of cuts are made in transparent lamina 106 to complete self-laminating badge assembly 100. These cuts are made through the thickness of transparent lamina 106 in continuous lines or cuts or intermittently in lines of perforation. The continuous cut lines divide adjacent areas of transparent lamina 106 while the lines of perforation form lines that facilitate folding of adjacent areas of lamina 106. Cuts or perforation lines are designated transverse when they are oriented transverse to the length of badge assembly 100 and are designated parallel when they are parallel to the same.

Transparent lamina 106 is cut into separate badge sections by the combination of interconnected first transverse cut 112, first parallel cut 114, second transverse cut 116, second parallel cut 118 and third transverse cut 120; and the spaced apart combination of interconnected fourth transverse cut 122, fourth parallel cut 124 and fifth transverse cut 126. Second parallel cut 114 is formed in and through the center of transparent lamina 106, adjacent to but spaced from the edge of paint lamina 110.

First and second transverse perforated fold lines 128 and 130 extend across and through transparent lamina 106, intersecting and oriented perpendicular to first and second parallel cuts 114 and 118. A first parallel perforated fold line 132 extends from and parallel to second parallel cut 118 until it intersects fourth transverse cut 122.

A portion of transparent lamina 106 is die cut and removed forming die cut area 142 for each badge.

The above described cuts and perforated fold lines divide transparent lamina 106 into a forward print field 134, a rearward print field 136, a rearward transparent lamination section 138 and a forward transparent lamination section 140.

Forward print field 134 and rearward print field 136 are separated by medially disposed first transverse perforated fold line 128 while forward and rearward transparent lamination sections 140 and 138 are separated by medially disposed second transverse perforated fold line 130. Print fields 134 and 136 are joined to transparent lamination sections 138 and 140 only along first parallel perforated fold line 132.

An offset section 144 between first parallel perforated fold line 132 and forward print field 134 offsets print fields 134 and 136 from fold line 132 and is left unpainted to provide a transparent fourth edge when the badge is assembled.

After the desired information is written or printed on print fields 134 or 136, transparent lamina 106 is removed from the release surface of paper 102 and a laminated badge 146 (see FIG. 18) is assembled in the sequence shown in FIGS. 15–18.

Figure 15:
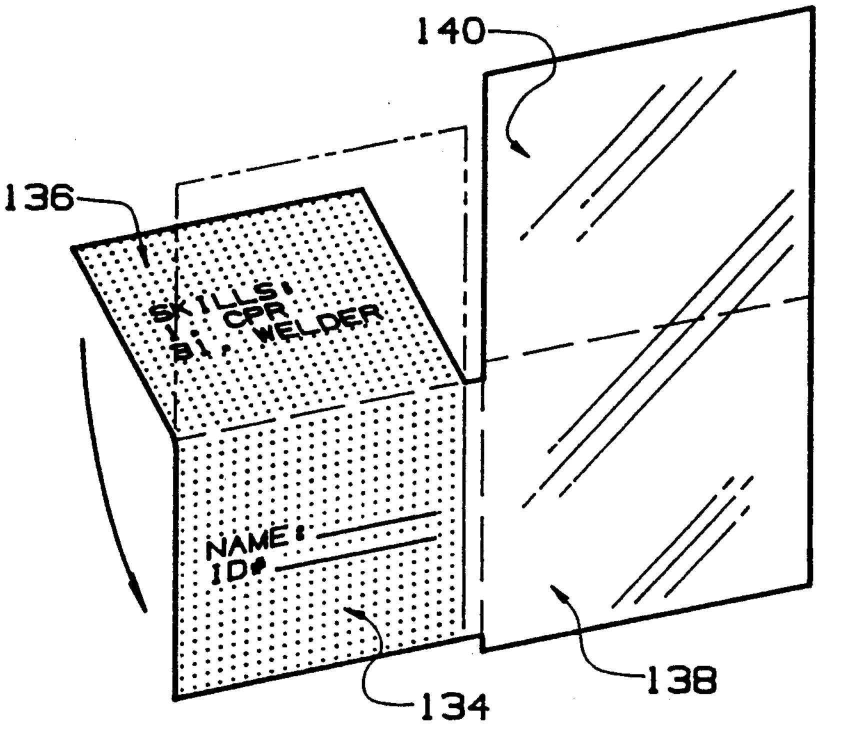
FIG. 15 is a perspective view of a badge removed from the carrier paper of the badge assembly of FIG. 13 depicting a rearward print field as it is folded in the direction of the arrow into congruent juxtaposition with a forward print field.

FIG. 15 illustrates a first fold along line 128 (see FIG. 13) in the direction of the arrow of rearward print field 136 into congruent juxtaposition with a forward print field 134. Pressure sensitive adhesive lamina 108 disposed on the rear surface of print fields 134 and 136 adheres field 134 to 136 as seen in FIG. 16.

Figure 16:
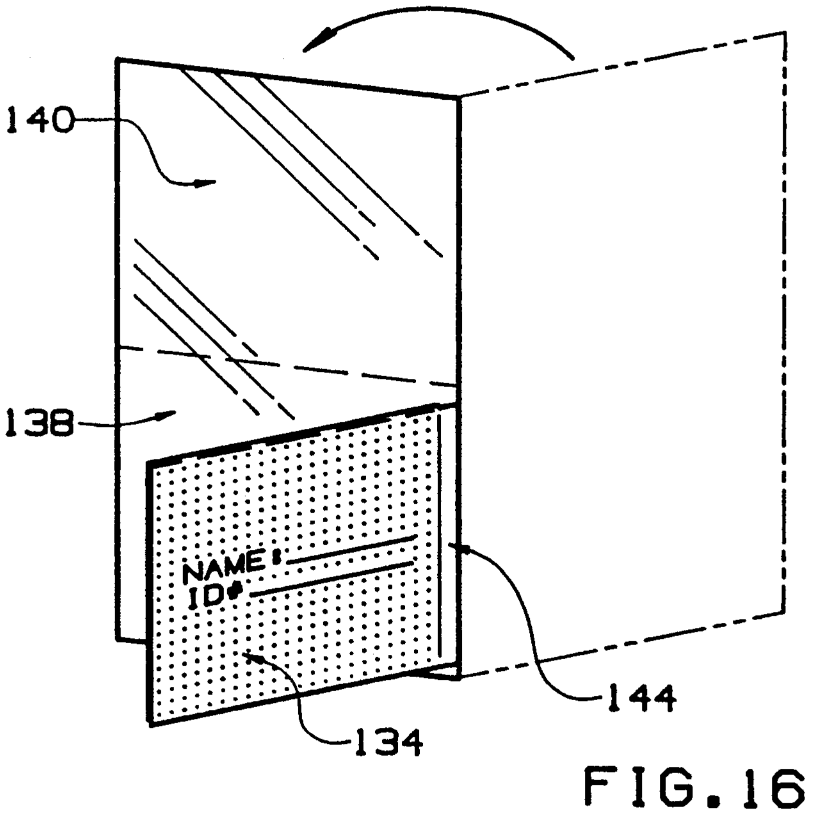
FIG. 16 is a perspective view of the badge of FIG. 17 depicting a rearward transparent lamination section as it is folded in the direction of the arrow into superimposition with the rearward print field.

FIG. 16 illustrates the next fold in the direction of the arrow along first parallel perforation line 132 (see FIG. 13) of rearward transparent lamination section 138 into superimposition with the rearward print field 136.

Figure 17:
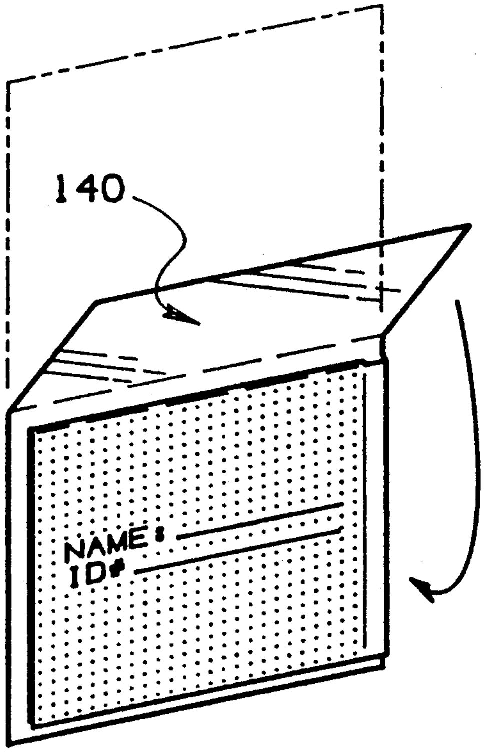
FIG. 17 is a perspective view of the badge of FIG. 16 depicting a forward transparent lamination section as it is folded in the direction of the arrow into superimposition with the forward print field.
Figure 18:
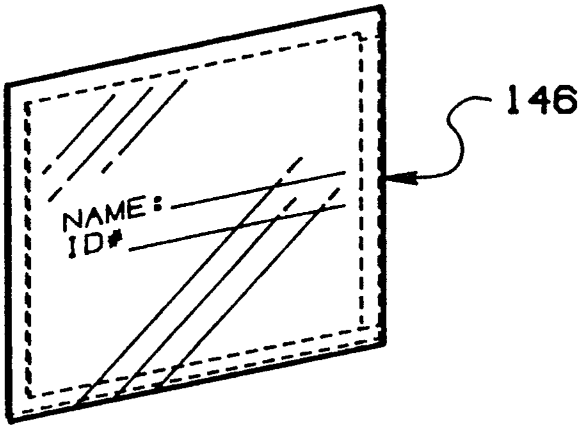
FIG. 18 is a perspective view of the assembled laminated badge of FIG. 17.

FIG. 17 illustrates the final fold in the direction of the arrow along second transverse perforated fold line 130 (see FIG. 13) of forward transparent lamination section 140 into superimposition with the forward print field 134. Pressure sensitive adhesive lamina 108 adheres lamination sections 138 and 140 to print fields 134 and 136 to produce a laminated badge 146 of FIG. 18. As seen in FIG. 18, all four peripheral edges of lamination sections 138 and 140 overlap print fields 134 and 136 to adhere to the opposite margins and seal print fields 134 and 136 within transparent edges.

I claim:

1. A self-laminating badge, comprising:

a transparent lamina;

a print field for recording written or printed information disposed on a portion of a first surface of the transparent lamina, wherein a remaining portion of the transparent lamina not covered by the print field includes a lamination portion of sufficient proportion to be folded to cover both forward and rearward surfaces of an area of the transparent lamina covered by the print field; and a pressure sensitive adhesive lamina disposed on at least a portion of a second surface of the transparent lamina in a position to adhere the print field to the lamination portion such that when the badge is assembled, the lamination portion covers and adheres to both forward and rearward surfaces of the area of the transparent lamina covered by the print field, wherein the print field includes adjacent forward and rearward print field sections that can be folded to form forward and rearward badge faces, wherein the lamination portion of the transparent lamina is provided in two lamination sections each of sufficient size to cover the forward or rearward badge faces and wherein the lamination sections are separated by a perforated line means in the transparent lamina for defining a fold line for accurately folding the lamination sections relative to each other.

2. A badge as set forth in claim 1, wherein the forward and rearward print field sections are separated by a perforated line means in the transparent lamina for defining a fold line for accurately folding the print field sections relative to each other.

3. A badge as set forth in claim 2, wherein the forward and rearward print field sections are separated from the lamination sections by a perforated line means in the transparent lamina for defining a fold line for accurately folding the print field sections relative to the lamination sections.

4. A badge as set forth in claim 3, wherein the forward print section is adjacent and connected to a rearward lamination section and wherein the rearward print section is adjacent and separated from a forward lamination section.

5. A badge as set forth in claim 4, including a carrier paper that releasably adheres to the pressure sensitive lamina and mounts the transparent lamina.

6. A badge as set forth in claim 5, wherein the carrier paper includes drive means for engaging the drive mechanism of a printer.

7. A badge as set forth in claim 6, wherein the print field is painted on the surface of the transparent lamina.

8. A badge as set forth in claim 7, wherein free peripheral edges of the lamination sections of an assembled badge extend beyond the print field and overlap to seal peripheral edges of the print field.

9. A continuous form assembly of self-laminating badges, comprising;

a continuous length of transparent lamina;

a lamina of pressure sensitive adhesive adhered to a first surface of the transparent lamina;

a continuous length of carrier paper releasably adhered to the lamina of pressure sensitive adhesive which mounts the transparent lamina; wherein a plurality of spaced apart transverse cuts through a thickness and across a width of the transparent lamina forms a plurality of badges each of which includes, a print field for recording written or printed information disposed on a portion of a second surface of the transparent lamina, wherein a remaining portion of the transparent lamina not covered by the print field includes a lamination portion of sufficient proportion to be folded to cover both forward and rearward surfaces of an area of the transparent lamina covered by the print field; and a pressure sensitive adhesive lamina disposed on at least a portion of the first surface of the transparent lamina in a position to adhere the print field to the lamentation portion such that when the badge is assembled, the lamination portion covers and adheres to both forward and rearward surfaces of the area of the transparent lamina covered by the print field, wherein the print field includes adjacent forward and rearward print field sections that can be folded to form forward and rearward badge faces, wherein the lamination portion of the transparent lamina is provided in two lamination sections each of sufficient size to cover the forward or rearward badge faces and wherein the lamination sections are separated by a perforated line means in the transparent lamina for defining a fold line for accurately folding the lamination sections relative to each other.

10. An assembly as set forth in claim 9, wherein the forward and rearward print field sections are separated by a perforated line means in the transparent lamina for defining a fold line for accurately folding the print field sections relative to each other.

11. An assembly as set forth in claim 10, wherein the forward and rearward print field sections are separated from the lamination sections by a perforated line means in the transparent lamina for defining a fold line for accurately folding the print field sections relative to the lamination sections.

12. An assembly as set forth in claim 11, wherein the forward print section is adjacent and connected to a rearward lamination section and wherein the rearward print section is adjacent and separated from a forward lamination section.

13. An assembly as set forth in claim 12, wherein the carrier paper includes drive means for engaging the drive mechanism of a printer.

14. An assembly as set forth in claim 13, wherein the print field is painted on the surface of the transparent lamina.

15. An assembly as set forth in claim 14 wherein free peripheral edges of the lamination sections of an assembled badge extend beyond the print field and overlap to seal peripheral edges of the print field.

* * * * *